Figure 1B:
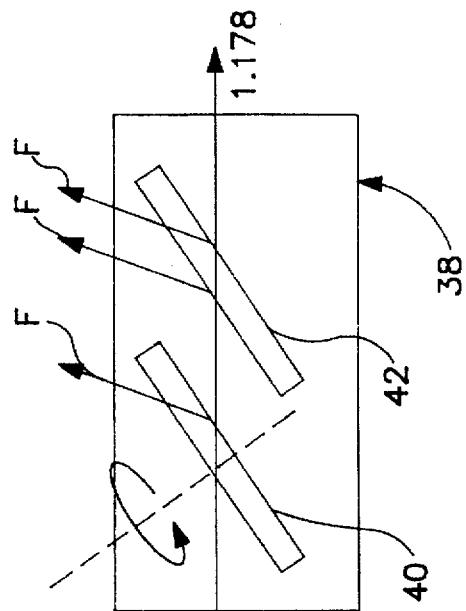

United States Patent [19]

Injeyan et al.

[11] Patent Number: 5,721,748
[45] Date of Patent: Feb. 24, 1998

[54] INTRACAVITY DOUBLED SOLID STATE RAMAN LASER SYSTEM

[75] Inventors: Hagop Injeyan, Glendale; Eric C. Cheung, Torrance; James G. Ho, Los Angeles, all of Calif.

[73] Assignee: TRW Inc., Redondo Beach, Calif.

[21] Appl. No.: 712,233

[22] Filed: Sep. 11, 1996

[51] Int. Cl.[6] ............................................... H01S 3/30
[52] U.S. Cl. .......................... 372/3; 359/327; 372/20; 372/21
[58] Field of Search ............................ 372/3, 20–22, 372/39, 41; 359/326, 327

[56] References Cited

U.S. PATENT DOCUMENTS

| | | | |
|---|---|---|---|
| 3,590,266 | 6/1971 | Johnston, Jr. et al. | 359/327 |
| 4,048,516 | 9/1977 | Ammann | 372/3 |
| 4,958,910 | 9/1990 | Taylor et al. | 359/327 |
| 5,099,147 | 3/1992 | Gregor et al. | 359/327 |
| 5,163,061 | 11/1992 | Moberg | 372/3 X |
| 5,467,214 | 11/1995 | Heflinger et al. | 359/238 |

OTHER PUBLICATIONS

A.F. Banishev, et al., "High–Temperature Raman Spectra of CaWO$_4$ in the Crystalline and Fused State," Sov. Phys. Crystallography, 27(3), May 1982, 374–375.

*Primary Examiner*—John D. Lee
*Attorney, Agent, or Firm*—Michael S. Yatsko

[57] ABSTRACT

An intracavity doubled solid state Raman laser system for converting the frequency of a laser input beam emitted by a laser pumping system is described. A solid Raman medium is disposed within a resonator cavity to shift the frequency of the input beam to produce a Raman beam. The frequency of the Raman beam is tuned in the resonator cavity preferably using an etalon and a birefringent filter. The polarization of the Raman beam is selected using a polarizing element disposed in the resonator cavity. The Raman beam frequency is doubled using a non-linear doubling medium inside the resonator cavity. The Raman laser system is particularly suitable for producing yellow light.

34 Claims, 1 Drawing Sheet

INTRACAVITY DOUBLED SOLID STATE RAMAN LASER SYSTEM

BACKGROUND

The present invention relates to solid state lasers and, more particularly, to a solid state Raman laser system for converting the frequency of a laser beam.

It is advantageous to be able to produce high quality laser output over a broad range of wavelengths or frequencies. This is because a given wavelength or frequency is commonly most desirable for a given application. The capability of generating selected wavelengths makes possible the utilization of wavelength dependent reflective and transmissive effects and atomic processes in materials.

Regarding solid state lasers, there is a relatively small group of effective laser materials, limiting the number of wavelengths that are available. Accordingly, it is oftentimes difficult to identify a laser material capable of producing a wavelength or frequency that is best suited for a particular application.

There are a number of known methods for increasing the number of different wavelengths, as well as the frequency range, that can be emitted by solid state lasers. These methods increase the range of applications of such lasers. Nonlinear optics based on the nonlinear response of materials to intense electromagnetic radiation is commonly used in these methods. Nonlinear optical effects occur when the intensity of the radiation incident on a material becomes sufficiently high that the intensity of the wave scattered by the material is no longer simply proportional (linear) with respect to the intensity of the incident wave.

Non-linear optical frequency conversion processes include parametric processes and stimulated scattering processes. Parametric frequency conversion processes include harmonic conversion, sum and difference frequency mixing, and parametric oscillation. These parametric processes may be second and higher order.

Second order harmonic conversion generates a wavelength equal to one-half of that of the incident wavelength and, accordingly, a frequency twice that of the incident wave. The doubling of the incident wave frequency is known as frequency doubling. The higher order harmonic conversions further increase the frequency of the incident wave.

Three-wave sum frequency mixing generates radiation of an increased frequency from two incident wavelengths. Three-wave difference frequency mixing generates radiation of a reduced frequency from two incident wavelengths. These two types of frequency mixing are second order processes.

Second order parametric oscillation generates two wavelengths (and frequencies) from an incident wavelength. The generated frequency is lower than that of the incident wave.

Stimulated scattering processes include stimulated Raman scattering ("SRS"). Stimulated Raman scattering involves the scattering of an incident wave at a different frequency. The scattered wave has a lower frequency (and longer wavelength) than the incident wave if the medium is initially in its ground state. The scattered wave is termed a Stokes wave. The scattered wave has a higher frequency (and shorter wavelength) than the incident wave if the medium is initially in an excited state, and the scattered wave is termed an anti-Stokes wave. The first generated wave is termed the first Stokes or first anti-Stokes wave. The first Stokes (or anti-Stokes) wave can act as a pump for a second Stokes wave in a second stimulated Raman interaction. Higher order Stokes waves may also be generated. The frequency of the second and higher order waves is shifted from that of the first Stokes wave. Thus, Raman shifting can be used to produce several wavelengths by utilizing different shifts. In some instances, however, it is undesirable to produce such higher order waves because they tend to decrease the intensity of the desired Stokes wave.

An important application of frequency conversion is the field of telescope optics and, particularly, uplink atmospheric distortion compensation using the "guidestar" approach. One form of guide star is produced by a laser source emitting at the sodium line. Sodium emits a $D_1$ line at 589.0 nm and a $D_2$ line at 589.6 nm. A laser beam is directed at the mesospheric sodium layer to cause the emission of radiation which is used to compensate for distortions seen by telescopes due to atmospheric aberrations. The sodium line emitted by the laser source is conventionally produced by sum frequency mixing. This technique is inadequate due to the difficulty of maintaining careful control of the pulse timing of the two lasers used to generate the laser output.

The known systems for generating different wavelengths and frequencies in solid state lasers by non-linear frequency conversion processes are inadequate for several reasons. The known systems are unable to provide high efficiency conversion from low peak power pumping lasers to generate a range of wavelengths. In addition, the known systems are unable to effectively discriminate between first order Stokes waves and higher order Stokes waves generated during Raman scattering processes. Furthermore, the known systems are unable to efficiently provide high quality yellow light by frequency conversion.

Thus, there is a need for a solid state laser system that overcomes the problems associated with the known systems.

SUMMARY

The present invention is directed to an intracavity doubled Raman laser system that satisfies the above needs. The present invention provides high efficiency conversion from low peak-power pumping lasers to generate a high quality output beam. The output beam may be generated over a range of different wavelengths. In addition, the present invention provides close tuning of both the pump laser and the Raman resonator to produce an output beam of a finely selected wavelength. This tuning enables the present invention to discriminate between the first order Stokes wave and higher order Stokes waves generated during Raman scattering to control the oscillation frequency of the pumping laser and the Raman resonator. This allows efficient production of high quality yellow light by frequency conversion.

The intracavity doubled solid state Raman laser system according to the present invention comprises a laser pumping system for producing an input beam and a resonator cavity optically coupled to the laser pumping system to admit the input beam. A solid Raman medium is disposed within the resonator cavity to shift the frequency of the input beam so as to generate a Raman beam. A first frequency selection element disposed within the resonator cavity selects the frequency of the Raman beam, and a second frequency selection element also disposed within the resonator cavity tunes the frequency of the Raman beam to a narrower bandwidth than the first frequency selection element. The tuned Raman beam is frequency doubled by a solid non-linear frequency doubling medium disposed within the resonator cavity to produce an output beam. An output coupler extracts the output beam from the resonator cavity. The laser pumping system preferably comprises a Nd:YAG laser which emits at a wavelength of 1.064 microns. The input beam emitted is preferably mode-locked. The resonator cavity preferably has a bow tie configuration to correct for aberrations due to mirror curvature and to maintain short mode-locked pulses. The input beam and the Raman beam achieve high intensities, which increases the Raman shifting efficiency of the Raman crystals and the doubling efficiency of the doubler crystal. Consequently, the present invention achieves a high efficiency conversion of the input beam to the output beam.

The solid Raman medium preferably comprises crystalline calcium tungstate. This material characteristically shifts the frequency of the input beam from about 1.064 microns to about 1.178 microns. The shifted wavelength corresponds to twice the wavelength of the sodium yellow emission line.

The first frequency selection element preferably comprises a birefringent filter for selecting the frequency of the Raman beam to that of the first Stokes wave frequency and eliminating other higher order Stokes waves from the Raman beam. The second frequency selection element is preferably an etalon which finely tunes the Raman beam frequency to that of the first Stokes wave. A polarizing element such as an uncoated plate is oriented at the Brewster angle in the resonator cavity to select the polarization of the Raman beam.

The frequency doubling medium preferably comprises a material selected from the group consisting of LBO, LTBO, CLBO, BBO, KTP, KTP isomorphs including KTA, RTA and RTP, and KD*P. These materials are capable of doubling the frequency of the Raman beam so that it corresponds to the frequency of the sodium yellow emission line.

The output coupler is an output mirror highly transmissive to the wavelength of the output beam and highly reflective to the wavelength of the Raman beam. The output coupler ensures that the output beam comprises substantially only the desired wavelength and that the wavelength of the Raman beam is directed into the resonator cavity.

DRAWINGS

Figure 1A:
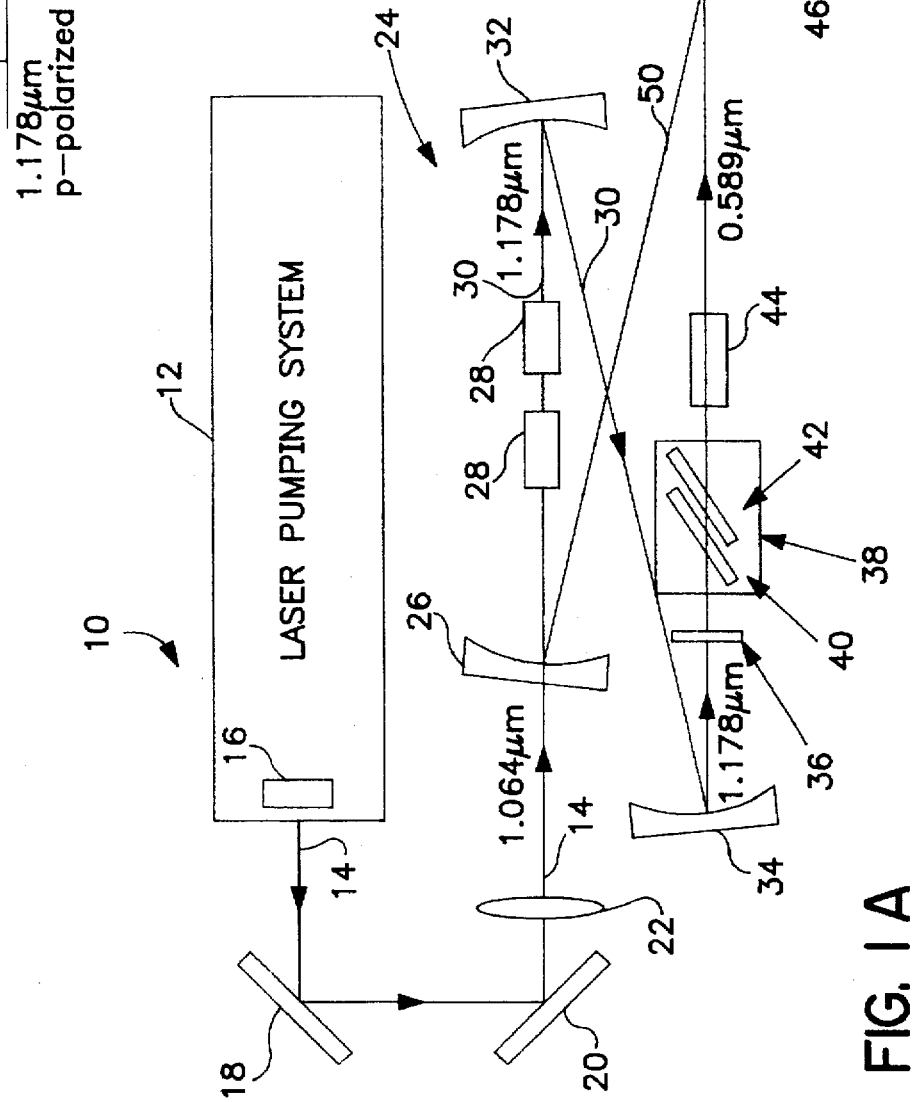

These and other features, aspects and advantages of the present invention will become better understood from the following drawings, description and appended claims, where:

FIG. 1a is a schematic block diagram of an intracavity doubled Raman laser system according to the present invention; and FIG. 1b is an enlarged view of the interaction of the Raman shifted beam with the birefringence filter and uncoated plate of the intracavity doubled Raman laser system of FIG. 1a.

DESCRIPTION

The present invention is an intracavity doubled solid state Raman laser system 10 as illustrated in FIG. 1a. The Raman laser system 10 comprises a laser pumping system 12 which produces a laser input beam. The laser pumping system 12 preferably comprises a Nd:YAG laser source which emits at a major wavelength of about 1.064 microns. Thermal control of the lasing medium in the laser pumping system may be used to tune frequency of the input beam 14.

The laser pumping system 12 preferably produces a short pulse, mode-locked operation. The mode-locked pulses are particularly suitable for guide star applications using sodium yellow light. The laser pumping system 12 preferably comprises a mode-locked pump laser oscillator and at least one pump laser amplifier (not shown).

The laser pumping system 12 comprising a Nd:YAG laser source emits an input beam 14 at about 1.064 microns. As shown, the laser pumping system 12 preferably includes an intracavity etalon 16 or a like frequency selecting element having a narrow transmission bandwidth as compared to the gain bandwidth of the laser pumping system 12. The orientation of the etalon 16 is varied to selectively tune the frequency of the input beam 14. The etalon 16 enables the input beam 14 to be finely tuned about the frequency of about 1.064 microns to cause the Raman laser system 10 to operate at the peak Raman gain level. The etalon 16 typically has a nominal thickness of about 250 microns and comprises nominal 50% reflectivity coatings applied to opposed sides.

The input beam 14 as tuned by the etalon 16 is reflected a first time by a planar mirror 18 and then a second time by a planar mirror 20. The twice-reflected input beam 14 is directed by the mirror 20 to a double convex lens 22 which focuses and transmits the input beam. The lens 22 is preferably coated with an anti-reflective coating to provide high transmission at the input beam 14 wavelength of about 1.064 microns. The transmitted input beam 14 is then directed to a synchronously mode-locked ("synchronously pumped") resonator cavity 24 to convert the frequency of the input beam 14. As used herein, the term "synchronously pumped" refers to the use of a Raman resonator cavity 24 that has a cavity round trip time equal to the laser pumping system 12 cavity round trip time such that the Raman converted pulses always overlap with a pump pulse in the Raman crystals 28 as described below.

The resonator cavity 24 preferably has a bow tie configuration as shown. The bow-tie configuration provides efficient conversion of the input beam 14 to an output beam. The bow tie resonator cavity 24 is also capable of maintaining a $TEM_{00}$ mode of the input beam 14. This mode is particularly useful in guide star applications.

The input beam 14 is directed to a plano-concave input mirror 26 of the resonator cavity 24. The mirror 26 is highly transmissive to the wavelength of the input beam 14. The position of the mirror 26 is adjusted relative to the focus of the lens 22 to mode match the input beam 14 into the resonator cavity 24. The input beam 14 makes a single pass through a solid, non-linear Raman medium. The Raman medium may be one crystal, or more than one crystal such as the illustrated pair of Raman crystals 28. The Raman crystals 28 are selected to provide an adequate gain to overcome the losses incurred in the resonator cavity 24. This is achieved by selecting a Raman medium having a suitable gain coefficient and using a sufficient length of the Raman material in the resonator cavity 24. The input beam stimulates scattering in the Raman crystals 28 to generate a Raman beam 30 at a frequency (and wavelength) shifted from that of the input beam 14.

The Raman crystals 28 are preferably composed of calcium tungstate ($CaWO_4$), which has a Raman gain coefficient of about 2 cm/GW and is highly transparent at the about 1.064 micron wavelength of the input beam 14. Stimulated scattering of the input beam 14 within the calcium tungstate Raman crystals 28 produces a Raman beam 30 having a greater wavelength and a lower frequency than the input beam. Particularly, the Stokes wavelength of the Raman beam 30 is about 1.178 microns. This wavelength equals twice the wavelength of a 589 nm wavelength of yellow light. The frequency of the Raman beam 30 is predominantly at the first Stokes wavelength. Other Stokes and anti-Stokes order transitions are also produced within the Raman crystals at a lower intensity than the first Stokes wave.

According to the present invention, other solid state Raman materials may be used to produce the Raman beam 30. Such other Raman materials include potassium dyhydrogen phosphate (KDP), KD*P and the like.

The Raman crystals 28 may have a "zig-zig" slab geometry (not shown) to minimize thermal effects on their optical properties. Other means of temperature control of the Raman crystals 28 may also be employed to control the Stokes wavelength. Temperature control of the Raman crystals 28 may also be used to tune the frequency of the Raman beam 30. This method of frequency control may be impractical in some instances, however, due to the relative insensitivity of Raman materials to temperature change. For example, the Raman shift of calcium tungstate varies about 0.28 GHz/° C., and so a temperature increase of 300° C. is needed to shift the frequency by about 100 GHz.

The Raman shifted beam 30 impinges upon a planoconcave mirror 32 positioned opposite to the calcium tungstate crystals 28 from the mirror 26. The mirror 32 is transmissive to residual about 1.064 micron input beam 14 waves passing through the Raman crystals 28, and is highly reflective at about 1.178 microns. The mirror 32 reflects the Raman beam 30 to a totally reflective, plano-concave mirror 34.

The Raman beam 30 is reflected from the mirror 34 and impinges on a first frequency selection element, which is preferably an etalon 36 or the like. The etalon 36 has a narrower transmission bandwidth than the gain bandwidth of the Raman crystals 28. The etalon 36 is adjustable to selectively tune the frequency of the Raman beam 30. The etalon 36 enables the Raman beam 30 to be finely tuned to limit oscillation within the resonator cavity 24 to a very narrow range of wavelengths within the bandwidth of the Raman crystals 28 and, particularly, to the first Stokes wavelength at about 1.178 microns for the calcium tungstate crystals 28. The etalon 36 typically has a thickness of about 500 microns and is preferably coated with partially-reflective coating having a nominal 50% reflectivity at about 1.178 microns.

The Raman beam 30 passes through the etalon 36 and impinges on a second frequency selection element 38 for tuning the frequency of the Raman beam 30. As shown in FIG. 1b, the Raman beam 30 is p-polarized after passing the etalon 36. The Raman beam 30 is directed to a birefringent filter 40, typically having a wedge configuration, which is rotated as shown. The birefringent filter 40 produces Fresnel reflections, F, at other wavelengths than the desired about 1.178 micron first Stokes shifted wavelength. These other wavelengths correspond to other Raman order transitions produced during scattering of the input beam 14 by the Raman crystals 28. The birefringent filter 40 removes other wavelengths from the Raman beam 30 that are close to the first Stokes wavelength. Such other close wavelengths tend to decrease the intensity of the about 1.178 micron wavelength. The birefringent filter 40 provides coarser wavelength tuning as compared to the etalon 36.

The respective positions of the etalon 36 and the birefringent filter 40 may be reversed so that the frequency of the Raman beam 30 is finely tuned after passing through the birefringent filter 40.

The second frequency selection element 38 preferably also comprises a polarizing element such as an uncoated plate 42 to provide additional frequency discrimination of the Raman beam 30. The uncoated plate 42 is oriented at the Brewster angle to allow light waves of the desired polarization to be preferentially transmitted and other light waves to be reflected as shown. The reflected wavelengths suffer losses, while the transmitted wavelength does not. Accordingly, the gain of the transmitted wavelength is amplified more than other wavelengths so that the Raman beam 30 contains substantially only p-polarized light.

The Raman beam 30 then passes to an intracavity doubler crystal 44 composed of a non-linear material. The doubler crystal 44 generates a second harmonic having a wavelength one-half of that of the Raman beam 30 and, accordingly, a frequency twice that of the Raman shifted beam 30. The doubler crystal 44 is preferably composed of a non-critically phase-matched type I crystal. Suitable doubler crystal 44 materials include crystals such as lithium triborate (LBO), lithium tetraborate (LTBO), cesium lithium hexaborate (CLBO), beta barium borate (BBO), potassium titanyl phosphate (KTP) and KTP isomorphs including potassium titanyl arsenate (KTA), rubidium titanyl arsenate (RTA), rubidium titanyl phosphate (RTP) and potassium dideuterium phosphate (KD*P).

For a Nd:YAG laser pumping system 12, calcium tungstate Raman crystals 28 and an LBO doubler crystal 44, the second harmonic has a wavelength of about 0.589 microns, which equals the wavelength of sodium yellow light.

The output frequency of the second harmonic generated by the doubler crystal 44 may be higher than the frequency of the input beam 14, but it is always lower than the frequency produced by directly doubling the input beam 14, instead of doubling the Raman beam 30 as in the present invention.

The doubler crystal 44 is preferably LBO, and it is maintained at an effective temperature so that it remains non-critically phase matched for doubling the Raman beam 30 at a temperature of about 40° C.

The doubler crystal 44 provides the advantage of functioning as the outcoupler for the resonator cavity 24, making it very efficient.

The frequency doubled beam generated by the doubler crystal 44 impinges on an output coupling mirror 46. A coating is preferable applied to the output coupling mirror 46 so that it is highly transmissive only to the wavelength of about 0.589 microns and is reflective to the Raman beam 30. This allows the production of an output beam 48 comprised predominantly of light waves having the wavelength of sodium yellow light.

The present invention provides a highly efficient system for generating different laser wavelengths. Synchronous pumping of the resonator cavity 24 provides the advantage that the input beam 14 makes only one pass through the Raman crystals 28, while the Raman beam 30 makes many passes through these crystals. Synchronous pumping of the resonator cavity 24 produces higher gain because the Raman shifted beam 30 makes many passes through the gain region to produce high amplification. Synchronous pumping permits the use of a mode-locked input beam 14 having a peak power that is too low to produce efficient, non-linear Raman shifting in other configurations in which the Raman beam makes only a single pass through the gain region and does not achieve the necessary intensity to stimulate scattering.

The bow-tie resonator cavity 24 configuration corrects for aberrations due to mirror curvature and maintains short mode-locked pulses. The input beam 14 and the Raman beam 30 are able to achieve high intensities, increasing the Raman shifting efficiency in the Raman crystals 28 and the doubling efficiency in the doubler crystal 44. Consequently, the efficiency of converting the input beam 14 to the output beam 48 is enhanced.

The present invention has been described in considerable detail with reference to certain preferred embodiments thereof, however, other embodiments are possible. Therefore, the spirit and scope of the appended claims should not be limited to the description of the preferred embodiments contained herein.

What is claimed is:

1. An intracavity doubled Raman laser system, the laser system comprising:

laser pumping means for emitting an input beam;

a resonator cavity optically coupled to the laser pumping means to admit the input beam;

a solid Raman medium disposed within the resonator cavity for shifting the frequency of the input beam to generate a Raman beam;

a first frequency selection means disposed within the resonator cavity for selecting the frequency of the Raman beam to a first bandwidth;

a second frequency selection means disposed within the resonator cavity for tuning the frequency of the Raman beam to a second bandwidth narrower than the first bandwidth;

a solid, non-linear frequency doubling medium disposed within the resonator cavity for doubling the frequency of the Raman beam as tuned by the first frequency selection means and the second frequency selection means to produce an output beam; and an output coupler for extracting the output beam from the resonator cavity.

2. The Raman laser system of claim 1, wherein the laser pumping means comprises a Nd:YAG laser.

3. The Raman laser system of claim 1, wherein the laser pumping means comprises means for mode-locking the input beam.

4. The Raman laser system of claim 1, wherein the resonator cavity has a bow tie configuration.

5. The Raman laser system of claim 1, further comprising an input mirror highly transmissive to the input beam wavelength and highly reflective to the Raman beam wavelength.

6. The Raman laser system of claim 1, wherein the solid Raman medium comprises crystalline calcium tungstate.

7. The Raman laser system of claim 1, wherein the first frequency selection means comprises a birefringent filter.

8. The Raman laser system of claim 1, wherein the second frequency selection means comprises an etalon.

9. The Raman laser system of claim 1, further comprising a polarizing element disposed in the resonator cavity for selecting the polarization of the Raman beam.

10. The Raman laser system of claim 1, wherein the frequency doubling medium comprises a material selected from the group consisting of LBO, LTBO, CLBO, KTP, KTA, RTA, RTP, BBO and KD*P.

11. The Raman laser system of claim 1, wherein the resonator cavity is configured to be synchronously pumped by the laser pumping means.

12. The Raman laser system of claim 1, wherein the output coupler comprises an output mirror highly transmissive to the wavelength of the output beam and highly reflective to the wavelength of the Raman beam, such that the output coupler reflects the wavelength of the Raman beam into the resonator cavity.

13. The Raman laser system of claim 1, wherein the laser pumping means comprises a Nd:YAG laser, the solid Raman medium comprises crystalline calcium tungstate, and the frequency doubling medium comprises a material selected from the group consisting of LBO, LTBO, CLBO, KTP, KTA, RTA, RTP, BBO and KD*P.

14. An intracavity doubled Raman laser system, the laser system comprising:

a mode-locked solid state laser pumping system for producing an input beam;

a bow tie resonator cavity optically coupled to the laser pumping system, the resonator cavity being synchronously pumped;

a solid Raman medium disposed within the resonator cavity for shifting the frequency of the input beam to generate a Raman beam;

an etalon disposed within the resonator cavity for tuning the frequency of the Raman beam;

a birefringent filter disposed within the resonator cavity for selecting the frequency of the Raman beam;

a polarizing element disposed within the resonator cavity for selecting the polarization of the Raman beam;

a solid, non-linear frequency doubling medium disposed within the resonator cavity for doubling the frequency of the Raman beam as tuned by the birefringent filter and the etalon to produce an output beam; and an output coupler for extracting the output beam from the resonator cavity.

15. The Raman laser system of claim 14, wherein the laser pumping system comprises a Nd:YAG laser.

16. The Raman laser system of claim 14, wherein the solid Raman medium comprises crystalline calcium tungstate.

17. The Raman laser system of claim 14, wherein the frequency doubling medium comprises a material selected from the group consisting of LBO, LTBO, CLBO, KTP, KTA, RTA, RTP, BBO and KD*P.

18. The Raman laser system of claim 14, wherein the laser pumping system comprises a Nd:YAG laser, the Raman medium comprises crystalline calcium tungstate, and the frequency doubling medium comprises a material selected from the group consisting of LBO, LTBO, CLBO, KTP, KTA, RTA, RTP, BBO and KD*P.

19. The Raman laser system of claim 14, wherein the output coupler comprises an output mirror highly transmissive to the wavelength of the output beam and highly reflective to the wavelength of the Raman beam, such that the output mirror reflects the wavelength of the Raman beam into the resonator cavity.

20. The Raman laser system of claim 14, wherein the resonator cavity is optically coupled to the laser pumping system by an input mirror highly transmissive to the input beam wavelength and highly reflective to the Raman beam wavelength.

21. A method for converting the frequency of a laser beam emitted by a laser pumping system, the method comprising the steps of:

emitting an input beam from a laser pumping system;

introducing the input beam into a resonator cavity optically coupled to the laser pumping system;

shifting the frequency of the input beam using a solid Raman medium disposed within the resonator cavity to generate a Raman beam;

selecting the frequency of the Raman beam to a first bandwidth using a first frequency selection element disposed within the resonator cavity;

tuning the frequency of the Raman beam to a second bandwidth using a second frequency selection element disposed within the resonator cavity, the second bandwidth being narrower than the first bandwidth;

doubling the frequency of the Raman beam as tuned by the second frequency selection element using a solid, non-linear frequency doubling medium disposed within the resonator cavity to produce an output beam; and extracting the output beam from the resonator cavity.

22. The method of claim 21, wherein the laser pumping system comprises a Nd:YAG laser.

23. The method of claim 21, wherein the input beam is mode-locked.

24. The method of claim 21, wherein the resonator cavity has a bow tie configuration.

25. The method of claim 21, wherein the solid Raman medium comprises crystalline calcium tungstate.

26. The method of claim 21, wherein the first frequency selection element is a birefringent filter.

27. The method of claim 21, wherein the second frequency selection element is an etalon.

28. The method of claim 21, further comprising the step of selecting the polarization of the Raman beam using a polarization selection element disposed in the resonator cavity.

29. The method of claim 21, wherein the frequency doubling medium comprises a material selected from the group consisting of LBO, LTBO, CLBO, KTP, KTA, RTA, RTP, BBO and KD*P.

30. The method of claim 21, wherein the resonator cavity is synchronously pumped by the laser pumping system.

31. The method of claim 21, wherein the step of introducing comprises passing the input beam to an input mirror highly transmissive to the input beam wavelength and highly reflective to the Raman beam wavelength.

32. The method of claim 21, wherein the step of extracting comprises passing the output beam to an output coupling mirror highly transmissive to the wavelength of the output beam and highly reflective to the wavelength of the Raman beam, and reflecting the wavelength of the Raman beam into the resonator cavity.

33. The method of claim 21, wherein the laser pumping system comprises a Nd:YAG laser, the solid Raman medium comprises crystalline calcium tungstate, and the frequency doubling medium comprises a material selected from the group consisting of LBO, LTBO, CLBO, KTP, KTA, RTA, RTP, BBO and KD*P.

34. The method of claim 33, wherein the output beam has a wavelength of about 0.589 microns.

* * * * *

UNITED STATES PATENT AND TRADEMARK OFFICE
CERTIFICATE OF CORRECTION

PATENT NO : 5,721,748
DATED : February 24, 1998
INVENTOR(S) : Hagop Injeyan, et al.

It is certified that error appears in the above-identified patent and that said Letters Patent are hereby corrected as shown below:

Col. 1, line 4
Add the following paragraph before BACKGROUND:

This invention was made with Government Support under F29601-93-C-0172 awarded by the U.S. Air Force. The Government has certain rights in this invention.

Signed and Sealed this

Seventeenth Day of April, 2001

*Attest:*

NICHOLAS P. GODICI

*Attesting Officer*     *Acting Director of the United States Patent and Trademark Office*